United States Patent [19]

Riley

[11] 4,448,237

[45] May 15, 1984

[54] SYSTEM FOR EFFICIENTLY EXCHANGING HEAT WITH GROUND WATER IN AN AQUIFER

[76] Inventor: William Riley, RD #1, P.O. Box 223, Pittstown, N.J. 08867

[21] Appl. No.: 404,354

[22] Filed: Jul. 30, 1982

Related U.S. Application Data

[63] Continuation-in-part of Ser. No. 207,405, Nov. 17, 1980, abandoned.

[51] Int. Cl.$^3$ .............................................. F24H 7/04
[52] U.S. Cl. .......................................... 165/2; 62/260; 165/45
[58] Field of Search ................. 165/1, 2, 45; 60/641.6; 62/260

[56] References Cited

U.S. PATENT DOCUMENTS

| | | | |
|---|---|---|---|
| 1,493,368 | 5/1924 | Merz | 60/641.6 |
| 2,461,449 | 2/1949 | Smith et al. | 62/260 |
| 2,503,456 | 4/1950 | Smith | 62/260 |
| 2,637,531 | 5/1953 | Davidson | 165/45 |
| 3,931,851 | 1/1976 | Harris et al. | 165/45 |
| 3,965,694 | 6/1976 | Vignal et al. | 62/260 |
| 3,965,972 | 6/1976 | Peterson | 165/45 |
| 4,157,730 | 6/1979 | Despois et al. | 165/45 |
| 4,190,099 | 2/1980 | Despois et al. | 165/45 |
| 4,201,060 | 5/1980 | Outmans | 165/45 |
| 4,224,805 | 9/1980 | Rothwell | 62/260 |

FOREIGN PATENT DOCUMENTS 2704938  8/1978  Fed. Rep. of Germany ........ 165/45

OTHER PUBLICATIONS

How to Tap the Energy Under Your Back Yard, Ingersoll, Popular Mechanics, Sep. 1980, pp. 155-158.
Heat-Pump Water Heaters, Powell, Popular Science, May 1982, p. 66.

*Primary Examiner*—Sheldon J. Richter
*Attorney, Agent, or Firm*—Thomas P. Dowd

[57] ABSTRACT

A method and means for using ground water in an aquifer as a heat source and heat sink are disclosed wherein heat is exchanged between the uniform temperature ground water and heat-exchanging apparatus at the earth's surface through a single well bore. The ground water is exchanged between an upper and lower portion of the aquifer, alternatively depending on the operating mode, in such a manner that a stratified lateral flow of the water after heat exchange is produced following natural convective paths in the top or bottom of the aquifer and resulting in wide laminar dissipation of the altered temperature water while avoiding thermal mixing between that water and the remaining uniform temperature water in the aquifer. This manner of exchange provides a continuous flow of heating or cooling water at or near the ambient aquifer temperature without any depletion of the aquifer. Embodiments are described wherein the aquifer water is brought to the earth's surface and wherein a separate heat-exchanging fluid is circulated between the aquifer and the earth's surface, and modifications are also disclosed involving a valved plenum device for use with the former embodiments and whereby the aquifer may be used to store solar heat.

21 Claims, 9 Drawing Figures

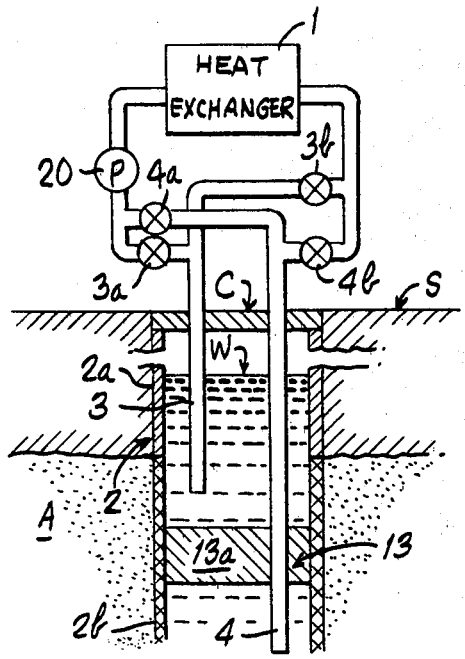
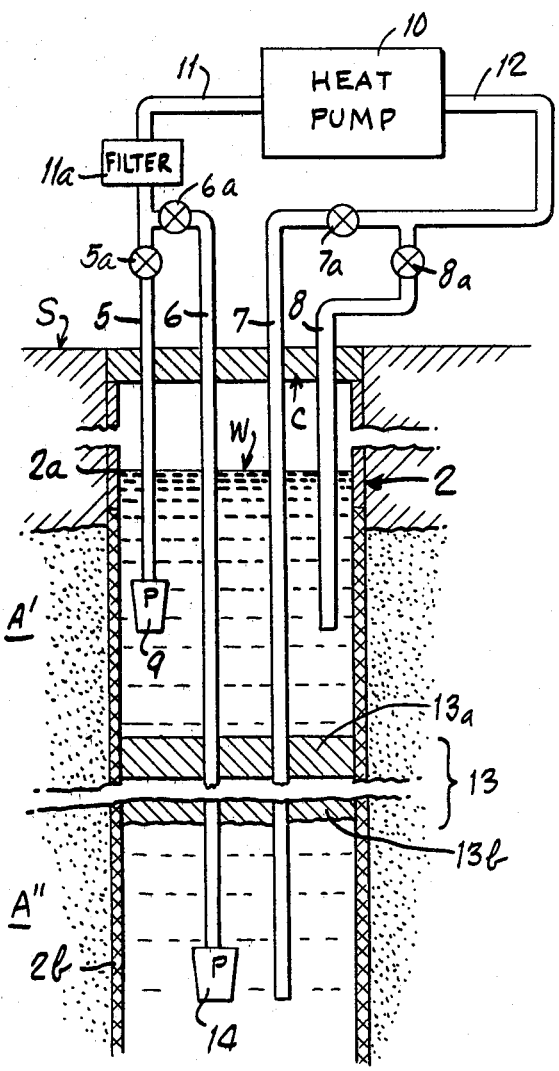
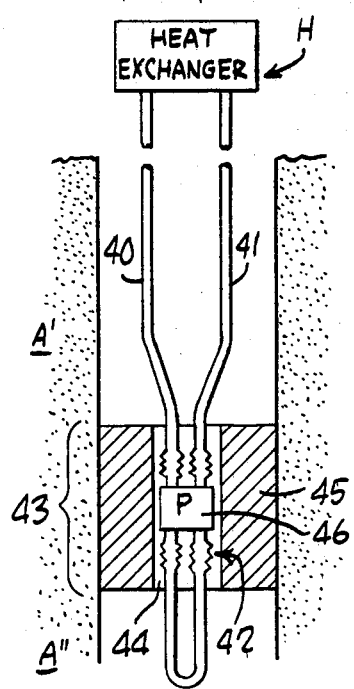

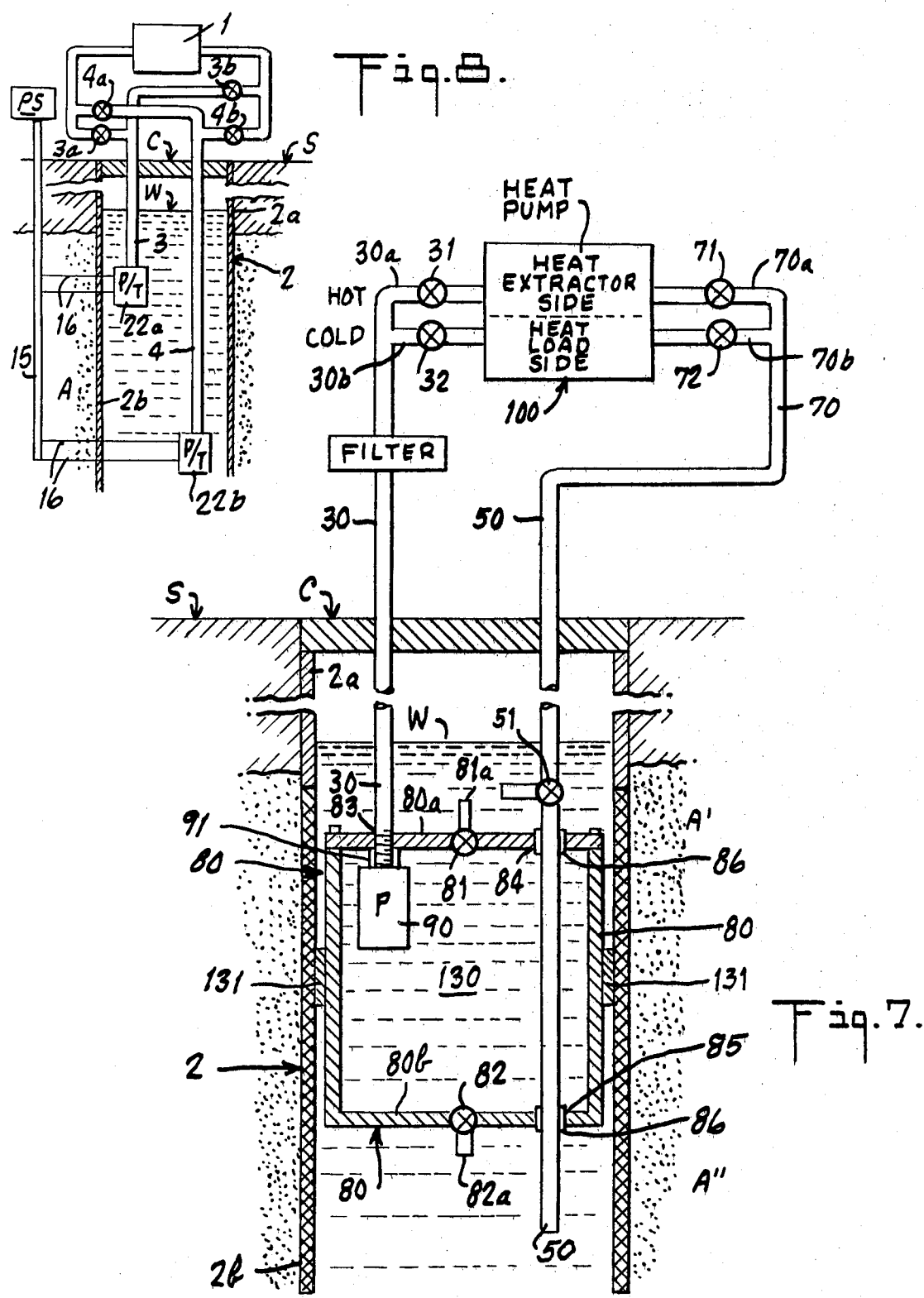

SYSTEM FOR EFFICIENTLY EXCHANGING HEAT WITH GROUND WATER IN AN AQUIFER

CROSS-REFERENCE

This is a continuation-in-part application based on my co-pending application Ser. No. 207,405 filed Nov. 17, 1980 abandoned.

BACKGROUND OF THE INVENTION

The present invention relates to a system for efficiently exchanging heat with ground water in an aquifer and more particularly to a system which may be installed in a single well bore and which by selectively creating a temperature difference within the aquifer produces convective effects that greatly increase the usefulness of the aquifer as both a heat source and a heat sink for exchanging heat with a utilization device, such as a heat pump, at the earth's surface.

With the growing search for alternative energy sources, new attention has been turned to extracting heat from within the earth. For many years different systems have been proposed, and some actually utilized, for withdrawing geothermal heat from regions deep beneath the earth's surface using water as the heat-exchange medium. An example of one system of this type is taught in U.S. Pat. No. 2,461,499 to Smith et al wherein a heat pump at the earth's surface is supplied with water pumped through two pipes extending down a single bore deep well, which pipes respectively withdraw and return water at different temperatures from and to aquifers in geothermally heated regions within the earth. This system takes advantage of the geothermal gradient, that is, the increase in temperature within the earth of about 1° F. for each 50 feet of depth, so that the pipes extend into regions that are 200 to 300 feet or much farther below the earth's surface. Since the geothermal temperature gradient is the opposite of that normall occurring in water, the cool water is located above the warm water in such deep regions. Consequently, the lower ends of the pipes are separated by at least 100 feet or more to avoid local convective mixing of the supply and return water in the aquifer, and a well packer is used therebetween to avoid mixing within the well. Accordingly, in such systems, the water, heated by the geothermally heated ambient rock at great depths, is brought to the earth's surface from the lower regions as a heat source, exchanges its heat at the surface and after cooling is exhausted to an upper region.

Other systems are known for drawing water from shallower aquifers at distances of 20 to 150 feet below the earth's surface for heat exchange purposes. A review of these latter systems, using a heat pump at the earth's surface, is presented in the September, 1980 issue of POPULAR MECHANICS magazine in an article at pages 155 to 158 entitled "How to Tap the Energy Under Your Backyard" by John H. Ingersoll. In contrast to the geothermally heated water in deep wells, shallower aquifers contain ground water which runs off from the earth's surface and primarily contains solar heat at relatively lower temperatures. Also, while geothermally heated water is at different temperatures at different subterranean levels, with the temperature increasing with depth, ground water is found to be of a comparatively uniform temperature and remains at a fairly constant year-round temperature in the aquifer equal to the mean annual temperature of its given geographical region. Consequently, the easily accessible ground water may act as a source of heat in winter by passing it through a suitable heat exchanger in contact with the relatively cooler atmosphere and as a heat sink in summer by passing it through a heat exchanger in contact with the relatively warmer atmosphere. However, once the heat has been exchanged with the water at the earth's surface, a problem is then presented by the need to dispose of the used or back water to provide a continuous flow for effective heat exchange.

As indicated in the cited POPULAR MECHANICS article, the two common solutions to the back water problem are dumping the water into a discharge pond or returning it down a second or recharge well directly into the same aquifer from which it has been withdrawn through a separate supply well. This practice is confirmed in the May, 1982 issue of POPULAR SCIENCE magazine at page 66 in an article entitled "Heat-Pump Water Heaters" by Evan Powell. In most locations the use or provision of a suitable discharge pond or stream, in view of the volume of water which may be discharged, will require not only proper soil type and grading, but possibly considerable piping and excavation. In addition, the dumping of such water in the wintertime when freezing may occur will usually require further modifications and adaptations of the discharge system. Further, if used on a large scale, such systems risk the depleting of the aquifer and exhausting of the sources of potable water. As a result, it appears that the preferred discharge system is a recharge well down which the back water may be returned to the aquifer. However, to avoid mixing of or heat exchange between the supply water and the back water in the aquifer, the recharge well must be a considerable distance from the supply well, so that in addition to the expense of drilling a second well, the expense of extensive piping and excavation may also be necessary. A further problem presented by the use of a recharge well is the fact that in many states of the United States, these wells are either not permitted or require special permits. An example of a system using supply and recharge wells is found in U.S. Pat. No. 2,637,531 to Davidson.

It would, of course, be desirable to withdraw and return the water using a single well bore, such as in the previously-mentioned Smith et al system, but as noted, the conditions in a shallow aquifer are different from those in the deep wells contemplated for use by Smith et al. As indicated above, in these deep wells the water is withdrawn from a region which is at one temperature and returned to a region which is at a different temperature, the cooler regions being disposed above the warmer regions in different aquifers, or in the same aquifer if it is of considerable depth. Since convective forces will normally cause the greater density cool water to seek a level below the lesser density warm water, the frictional characteristics of such aquifers, that is, their resistance to convective flow, must be relied upon to avoid mixing and heat exchange of the supply and return or back water. Reliance on this resistance is the reason for the large separation between the pipe ends in the Smith et al system. In contrast, within shallower ground water aquifers the physical characteristics are such that a uniform temperature is present in the aquifer, so that the use of the Smith et al system therein would not normally be feasible since, were such a system used in the aquifer, it would promote convective mixing of upper and lower layers thereby rapidly raising or lowering the temperature of the water at the inlet pipe and vitiating its usefulness for surface heat exchange. It has accordingly been the experience of those skilled in the art that if the back water is simply returned to the same well bore, either as in Smith et al or randomly, the back water will mix with the supply water being drawn from the aquifer by virtue of both the mechanical action of the pump and the convective forces within the bore and aquifer, thus quickly negating the heat exchange value of the supply water.

The present invention is directed to a system for use with shallower ground water aquifers that solves the back water problem and wherein a single well bore is used as both the supply well and recharge well for circulating ground water through heat-exchanging apparatus at the earth's surface, thus obviating the need for extensive piping, drilling or excavation as in the prior art systems of this type while achieving comparable or better heat exchange results and avoiding aquifer depletion and potable water loss. In addition, an alternative embodiment to the preferred embodiment is provided for significantly reducing the amount of input energy necessary to operate the system by obviating the need for pumping the water from the aquifer. A modification by which both embodiments may be adapted to permit the storage of further solar energy collected at the earth's surface in the aquifer is also described as well as a valved plenum arrangement for particular use with the former embodiment and a low-energy consumption adaptation of the former embodiment.

SUMMARY OF THE INVENTION

The present invention involves a system using ground water in an aquifer as a heat source and a heat sink for exchanging heat with utilization apparatus, such as a heat pump at the earth's surface, in a highly efficient and comparatively inexpensive manner that utilizes a single well bore as both the supply and recharge well. More particularly, the preferred system generally comprises a suitable heat-exchanger, at or near the earth's surface, connected to a piping arrangement running therefrom down a single well bore into upper and lower portions of the aquifer and suitable pumping apparatus for withdrawing the water from and returning it to the aquifer through the piping arrangement in a particular manner that creates a temperature difference which enhances continuous heat exchange with the aquifer. When it is desired to supply heat from the water to the heat-exchanger, water is withdrawn by pumping from the upper portion of the aquifer and after heat exchange is returned to the lower portion of the aquifer. Since the return or back water will have been cooled in passing through the heat exchanger, a temperature difference will be created in the normally uniform temperature aquifer as pumping continues. Accordingly, the relatively warmer water in the upper portion of the aquifer, which is at the normal or mean aquifer temperature, will be withdrawn, and the cooler water being returned to the lower portion of the aquifer will, by virtue of its greater density, sink toward the bottom of the aquifer and spread away from the well bore flowing laterally outward in a laminar manner in the aquifer. Conversely, when it is desired to draw heat through the heat exchanger into the water, water is pumped from the lower portion of the aquifer and returned to the upper portion. The relatively warmer returned water will tend to rise or float toward the top of the aquifer forming an upper layer by virtue of its lesser density and spreading away from the well bore continuously into the aquifer.

The two alternative flow paths both create a temperature condition in the aquifer that produces a natural tendency to laterally dissipate the return water and avoid mixing of the circulating water in the aquifer, particularly where there is sufficient distance between the level from which it is withdrawn and that to which it is returned. However, in many, if not most of the shallower aquifers, because of the back pressure against the return water the separation distance in itself may be insufficient to avoid some mixing of the water within the well bore. In these cases, a buffer region is preferably formed in the well bore by the simple expedient of setting up a barrier such as created by one or more well packers. Also, a valved plenum device particularly designed for use with the system is provided according to the invention and may act in this regard or the need for a buffer may be obviated by the use of a low-energy consumption version of the preferred system.

It has been found that, with a system in accordance with the present invention, very large volumes of water can be pumped or circulated between the aquifer and the earth's surface over extended periods of time with continuous steady heat-exchange effects and no appreciable change in the ambient temperature of the water at the withdrawal level in the aquifer due to mixing of the supply and return water. This occurs despite the use of a single well bore as both the supply and recharge well.

A further embodiment of the present invention is described wherein the water in the aquifer exchanges its heat with another heat-exchanging fluid which is circulated between the aquifer and a heat exchanger at the earth's surface. This arrangement obviates the necessity of pumping water from the aquifer to the earth's surface and thus may reduce the amount of energy required for operating the system.

The preferred system may also be readily used for storing additional solar energy in the aquifer by the simple expedient of installing a solar energy absorbing device or collector as the heat exchanger and operating the system to return the back water to the upper portion of the aquifer. Similarly, the further embodiment may be so modified to transfer solar heat to the circulating heat-exchanging fluid, and in both cases the heated water will be retained in the upper portion of the aquifer ready for withdrawal when needed.

BRIEF DESCRIPTION OF THE DRAWINGS

FIG. 1 is a diagrammatic view of the basic system in accordance with the present invention.

FIG. 2 is a diagrammatic view of one preferred embodiment of the present invention.

FIG. 3 is a diagrammatic view of a further embodiment using the present invention.

FIG. 7 is a diagrammatic view of a modification of the system of FIG. 1 including a valved plenum arrangement in accordance with the present invention.

FIG. 8 is a diagrammatic view of an adaptation of the system of FIG. 1 to minimize the operating nergy consumption.

DETAILED DESCRIPTION OF THE PREFERRED EMBODIMENT

Figure 4:
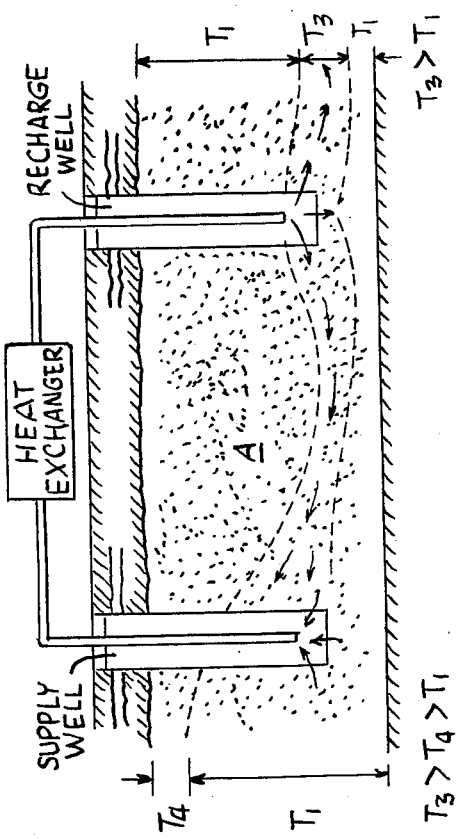
FIG. 4 is a diagrammatic view of the system of FIG. 1 illustrating the water flow in the aquifer when operating in the cooling mode.

A basic embodiment for practicing the present invention is shown diagrammatically in FIG. 1. A heat-exchange utilization device 1, such as a conventional water-to-air or water-source heat pump, is provided in a building or other facility in the vicinity of a single well bore 2. The well bore 2 extends from the earth's surface S into an aquifer A containing ground water W. A cap C is provided at the upper end of the bore 2 and if the earth in the region of the bore is of a sandy or soft consistency, the bore may be lined with a casing 2a having a well screen 2b thereon in the region of the aquifer A to permit the ground water W to fill the well up to its normal static level. In firm earth or rock strata no casing or screen may be needed.

For withdrawing the water W from the well to supply the heat-exchange device 1, a system including at least two conduits 3 and 4, is provided, one (3) extending down into the upper portion of the aquifer and the other (4) extending into the lower portion of the aquifer, with their open lower ends vertically displaced from each other, preferably at the maximum distance possible within the limits of the particular aquifer to be tapped. Each of the two conduits, 3 and 4, is adapted by means of valving 3a, 3b and 4a, 4b to withdrawn and return water to the respective regions of the aquifer in which their open lower ends are disposed. If the water is at such a level as to be readily accessible in a shallow well, a pump 20 may conveniently be provided at the earth's surface for withdrawing the water from the well through either of the conduits and supplying it to the heat exchanger 1. When it is desired to withdraw water from the upper aquifer and return it to the lower aquifer after passing through the heat exchanger 1, valves 3a and 4b are opened and valves 4a and 3b are closed. If the flow is to be reversed, the valves are oppositely adjusted.

Operation of the system in accordance with the present invention firstly takes advantage of the fact that in the earth's temperature zones, and particularly in most regions of the United States, the ground water in aquifers will be at a constant mean temperature of between 48° and 70° F., while the extremes of atmospheric temperature during the winter and summer seasons may vary between at least 0° and 100° F. Consequently, the temperature difference between the ambient atmosphere at the earth's surface and the ground water in shallow underground aquifers in most geographical regions will be considerable for a good part of the year. As a result, the ground water may be used at different times of the year as either a heat source or a heat sink. Following from this, the invention further takes advantage of the natural phenomenon of convection to efficiently exchange heat with the ground water when used in either of such manners.

More particularly, to operate the present system in winter when it is normally desired to withdraw heat from the aquifer and transfer it to the earth's surface, water is withdrawn from the upper portion of the aquifer and returned to the lower portion, so that the valves 3a, 3b, 4a, 4b will be set as indicated above, to cause pipe 3 to act as the supply pipe and pipe 4 to act as the return pipe. When the water is pumped in this manner by means of pump 20 through the heat exchanger 1, heat will be extracted or removed from the water by the cooler ambient atmosphere so that the return or back water exhausted to the lower portion of the well and aquifer will be at a lower temperature than the mean temperature of the aquifer water. This cooler water, by virtue of its greater density will tend to drop to the bottom of the well bore and flow laterally outwardly therefrom, stratifying horizontally with respect to the other water in the aquifer. Continued pumping of the water in the described manner will create a temperature difference within the aquifer with the cooled water lying on the bottom and dissipating continuously into the aquifer as an ever-extending layer while the large body of warmer water at the normal mean temperature of the aquifer occupies the entire upper portion of the aquifer. Consequently, a condition is created within the aquifer A wherein natural convective forces are used to advantage to prevent mixing of the supply and return water, so that with continued pumping the water being withdrawn from the upper portion of the aquifer remains at or near the initial mean temperature providing an essentially constant temperature water supply to the input of the heat exchanger 1.

Conversely, when cooling is desired at the earth's surface, such as during the summer, the valves are adjusted such that pipe 4 acts as the supply pipe withdrawing water from the lower portion of the aquifer, and pipe 3 returns the back water to the upper portion of the aquifer. In this arrangement the warmed back water will by virtue of its lower density due to its higher temperature tend to float in a layer at the top of the aquifer and thus avoid mixing with the mean temperature water in the entire lower portion of the aquifer, which latter water supplies the input to the heat exchanger 1.

Figure 5:
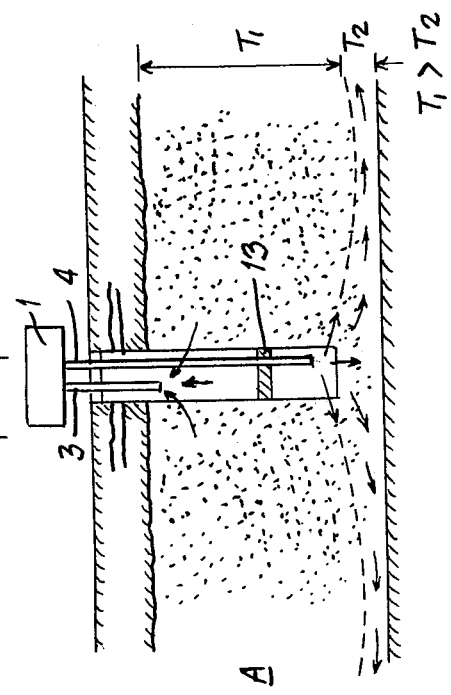
FIG. 5 is a diagrammatic view of the system of FIG. 1 illustrating the water flow in the aquifer when operating in the heating mode.

These two phenomena within the aquifer are graphically illustrated in FIGS. 4 and 5 respectively. As seen in FIG. 4, the cooled water at temperature $T_2$ when dumped into the bottom of the well bore will travel outwardly into the aquifer and, as it is more dense than the warmer aquifer water at temperature $T_1$, will displace the aquifer water upwardly forming an ever-extending stratified bottom layer in the aquifer. Meanwhile the uniform temperature aquifer water is being withdrawn from the upper portion of the aquifer, balancing the upward displacement of the lower aquifer water by the returned cool water. It will be seen that this manner of exchange minimizes the opportunity and tendency for any mixing between the withdrawn and returned water as well as any significant temperature exchange therebetween. Any warming of the outflowing cooler water by heat exchange with the other aquifer water or the aquifer material will tend to occur at the far reaches of the aquifer as the cooler stream spreads outwardly rather than near the well bore where the flow is most rapid. Accordingly, due to the natural convective forces, the resulting circulation will cause the warmer water in the aquifer to be provided for withdrawal before any cooler water, so that the temperature of the supply water will remain substantially constant at the temperature of its initial withdrawal from the aquifer until all of the water in the aquifer in the region of the well has been exchanged. Consequently with the present invention, the amount of heat which can be withdrawn from the aquifer is maximized.

Conversely, as shown in FIG. 5 when the system is in the cooling mode, the circulation in the aquifer will be inverted so that the cooler water at the temperature $T_1$ will be fully withdrawn before any warmer water, returned at temperature $T_3$, maximizing the ability of the supply water to accept heat in the heat exchanger 1 at the earth's surface.

Figure 6:
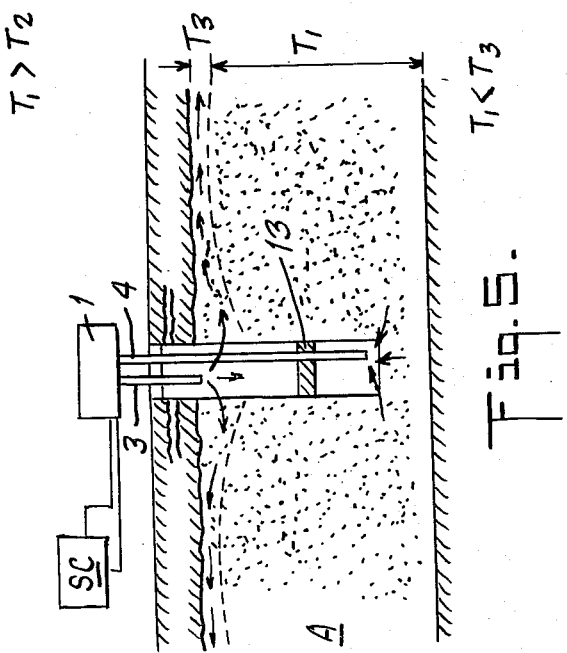
FIG. 6 is a diagrammatic view of a prior art system using a supply well and a recharge well and illustrating the water flow in the aquifer when operating in the heating mode.

By way of contrast in the typical prior art system shown diagrammatically in FIG. 6, the heated water when returned down the recharge well at temperature $T_3$ will, by virtue of its temperature and the pressure gradient created between the supply and recharge wells, tend to flow toward the withdrawal pipe creating a circulation within the aquifer directly between the two wells thus minimizing the use of the entire aquifer as a heat sink in the manner of the invention. The return water at $T_3$ also will undergo heat exchange with the aquifer water at $T_1$ while rising therethrough resulting in local heating of the aquifer water in the region of the supply well during continuous operation of the system. The temperature of the supply water will therefore rapidly approach that of the return water progressively destroying the usefulness of the system unless the two wells are very widely spaced.

It will accordingly be seen that the comparatively simple system of the present invention may be used in a single well bore to efficiently exchange heat for both cooling and heating between an underground aquifer and the earth's surface while minimizing thermal mixing between the supply and return water in the well or aquifer.

In the event that it is found that some mixing does occur in the well bore between the supply and back water due to conditions within a particular well bore such as a lack of depth in the aquifer or extreme back pressure retarding rapid absorption of the back water into the aquifer, a buffer region may be created in the well bore to overcome such mixing. Accordingly, as shown in FIG. 1, a barrier 13, conveniently in the form of a well packer 13a may be disposed in the well bore 2 between the lower ends of the pipes 3 and 4, and with pipe 4 extending in a sealed manner therethrough into the lower portion of the aquifer. This barrier 13 will act to prevent any direct mixing of the supply and back water, or any heat conduction within the water in the upper and lower portions of the well bore, so that thermal mixing is avoided. Pipe 4 may, of course, be suitably insulated to avoid any heat transfer between the water conducted thereby and the upper portion of the aquifer, although such transfer may generally be found to be insignificant in practice.

While the basic embodiment shown in FIG. 1 may be used to practice the invention and will be found to perform adequately in many applications, and while a reversible pump would be most suitable in simplifying and reducing the amount of piping involved in providing the necessary conduits, nevertheless, as a practical matter, because of the depth of most aquifers the more common approach today is the use of submersible pumps for lifting water out of wells. Accordingly, the embodiment shown in FIG. 2 using submersible pumps may presently be found preferable. As seen in FIG. 2 the system involves a set of four conduits or pipes 5, 6, 7 and 8 extending down into the well bore 2. Pipes 5 and 8 extend into the upper region or portion A' of the aquifer, and pipe 5 is fitted with a suitable submersible pump 9 for withdrawing water from the upper portion of the aquifer, while pipe 8 is adapted for returning water to the upper portion of the aquifer. Pipes 6 and 7, which may be suitably insulated, extend into the lower portion A" of the aquifer, and pipe 6 is fitted with a suitable submersible pump 14 for withdrawing water from the lower portion of the aquifer, while pipe 7 is adapted to return water to the lower portion of the aquifer. Each of the pipes is provided at its upper end with a respective valve 5a, 6a, 7a, and 8a for controlling the flow of water between it and the heat-exchange device which in this embodiment is preferably a water-source heat pump 10. Supply pipes 5 and 6 are connected to the input line 11 to heat pump 10 which may be provided with a suitable filter 11a, while return pipes 7 and 8 are connected to the output line 12 of the heat pump 10. With this comparatively simple system the heat pump 10 may be operated in both a heating and cooling mode in appropriate seasons by simply changing the connections at the pump and passing water therethrough in the manner as will now be described.

To operate the system in winter when it is desired to withdraw heat from the aquifer and transfer it to the air or other medium at the earth's surface, valve 5a is opened, valve 6a is closed, valve 7a is opened, and valve 8a is closed and lines 11 and 12 are connected to the heat extractor side of pump 10. Submersible pump 9 is turned on to begin withdrawing water from the upper portion A' of the aquifer through the well bore 2 and supply it through pipes 5 and 11 to the input of the heat pump 10. The water passes through the heat pump 10, and heat is extracted by heat exchange with, for example, the cooler ambient air. The return or back water exhausted from the heat pump 10 is conducted through pipes 12 and 7 down to the lower portion of the well and aquifer. The returned water being at a lower temperature than the mean temperature of the aquifer prior to the operation of the pump 9 will, by virtue of its greater density, tend to drop to the bottom of the aquifer and stratify horizontally with respect to the other water in the aquifer. Continued pumping by pump 9 will withdraw water from the upper portion A' of the aquifer that is still at the initial mean temperature while the exhaust or return water at the lower temperature will tend to remain and spread in a laminar manner horizontally creating a lateral flow outwardly from the well in the lower portion A" of the aquifer as generally illustrated in FIG. 4. Thus, while a temperature difference is created between the upper and lower portions of the aquifer by this circulation or exchange, the resulting condition acts to maintain the warmer or mean temperature water in the upper portion of the aquifer from which the water is being supplied to the heat pump 10, so that mixing of the supply and return water, which would otherwise tend to drop the temperature of the supply water, is impeded by the convection forces created within the aquifer. Further, if the depth of the aquifer is sufficient to permit the establishment of a considerable distance between the intake of the pump 9 and the outlet pipe of 7, no mechanical mixing within the well bore 2 will occur, as the back or return water will pass laterally out of the well into the lower portion of the aquifer, assuming there is no large back pressure or resistance to its absorption in the aquifer material. In aquifers of limited depth or high back pressure a buffer region within the well bore may be created between the upper portion A' and the lower portion A" of the aquifer by the use of a suitable waterproof barrier 13 such as one or more well packers 13a, 13b. This barrier 13 will positively prevent any mechanical mixing of the water in the upper and lower portions of the well bore as well as any heat conduction therebetween.

When it is desired to operate the heat pump 10 for cooling, such as during the summer or for refrigeration purposes, the system is adjusted by closing valve 5a, opening valve 6a, closing valve 7a, opening valve 8a and connecting lines 11 and 12 to the heat load side of pump 10. The system is then adapted to withdraw water from the lower portion A" of the aquifer by the operation of pump 14, supply it to the heat pump 10 through pipes 6 and 11, and to return the exhaust water from the heat pump through pipes 12 and 8 to the upper portion A' of the aquifer. With this arrangement the water which has been heated in the heat pump 10, by extracting heat from the warmer atmosphere at the earth's surface, is returned to the upper portion of the aquifer. This warmer water of lower density will tend to float on the relatively cooler water in the aquifer. Again, the convection forces will act to maintain a desirable circulation or exchange, so that the relatively cooler water at the mean temperature will continue to be withdrawn from the lower portion of the aquifer and the warmer back or return water will float in the upper portion flowing laterally outward into the aquifer without any tendency for the warmer and cooler water to mix as generally illustrated in FIG. 5.

It has been found through appropriate tests that the system of the present invention can be operated in the described manner over extended periods of time drawing water from a typical shallow aquifer without any significant change in the mean temperature of the supply water. Some examples of tests which have demonstrated the improved results of the invention are as follows:

EXAMPLE 1

Half of the system shown in FIG. 2, that is, supply pipe 5 with submersible extraction pump 9 and return pipe 7, was installed in a well bore and connected to a conventional water-to-air heat pump. Two-inch pipe was used in an 8-inch well bore and the distance between the upper region of the aquifer and the lower region, as defined by two spaced well packers, was about 21 feet with the upper packer being located about 85 feet beneath the earth's surface. A one-horsepower submersible pump was disposed on the bottom of the supply pipe at a level of about 80 feet below the surface. The water level rose within the well bore to about 10 to 15 feet below the surface of the well while the aquifer extended both above and below the well packers. The mean temperature of the well water at the start of the test was about 56° F.

The heat pump was set for heating, and a test was conducted at a flow rate of 9½ gallons per minute over a period of 175 hours. This amounted to a total gallonage of almost 100,000 gallons withdrawn from the upper portion of the aquifer and returned to the lower portion. The temperature difference in and out of the heat exchanger or pump was 8° F. measuring heat extracted, and the temperature drop in the upper aquifer input water was about 2° or 3° F. over the entire period. In this test the total BTU's extracted was approximately 6.4 million without an appreciable drop in the temperature of the input water from the aquifer.

EXAMPLE 2

The system of Example 1 was then set with the heat pump on cooling, reversing the direction of flow from that in accordance with the present invention. The initial temperature of the water from the upper aquifer into the pump was 53° F., and the temperature of the water out of the pump into the lower aquifer was 58° F. After a running time of about two hours at a flow rate of about 11 gallons per minute (a total flow of about 1320 gallons), the input temperature of the water from the upper aquifer had increased to 60° while the temperature of the water out of the pump was 64° F. It accordingly appeared that with a transfer of only about 38,000 BTU's to the aquifer the temperature of the input water was increased by 7°. This result evidenced the fact that the warmer water exhausted from the pump to the lower aquifer returned rapidly through convection forces to the upper aquifer by virtue of its lesser density, thereby reducing the heat-exchange capability of the system. This was in keeping with the mixing normally contemplated by those skilled in the art which has in the past rendered impractical the use of a single well bore for heat-exchange purposes.

EXAMPLE 3

The other half of the piping system was then installed in the well so that an entire system as shown in FIG. 2 was in place. This system was operated in the cooling mode, that is, withdrawing the water from the lower aquifer by pump 14 and supplying it to the heat pump input through supply pipes 6 and 11 and then exhausting the output water to the upper aquifer through return pipes 12 and 8. The temperature of the input water from the lower aquifer was 60° F., and 250,000 gallons of water were run through the heat pump with an in/out temperature difference of about 2° F., so that about 4,000,000 BTU's were transferred to the upper aquifer with no change in the input temperature of the supply water from the lower aquifer which remained at 60° F. A buffer region of about ten feet formed by two spaced well packers was used and prevented any mechanical mixing due to the "draw-down" effect produced by the pump 14 within the well bore. Thus, the reversal of direction back to that in accordance with the present invention vastly increased the efficiency of a single well bore as a heat sink.

EXAMPLE 4

To determine if heat could be extracted from the aquifer for an extended period of time without significant change, the system was run continuously during three months of winter from mid-December to mid-March in the heating mode at a water flow rate of about 560 gallons per hour, that is, between 9 and 10 gallons per minute, resulting in the processing of approximately 1.2 million gallons of water. At an average temperature difference of 7° F. between the water to and the water from the heat pump, the heat extracted, that is, 7° F.×8 lbs./gallon×1.2 million gallons, came to about 67,000,000 BTU's. Even after this amount of heat had been given up by the aquifer, the temperature of the water input remained comparatively constant at 54°±2° F.

It will be seen from the preceding examples that it has accordingly been determined that a heat exchanger, at or near the earth's surface, can be efficiently operated in both the heating and cooling modes using ground water extracted from and returned to the same aquifer through a single well bore by arranging the water flow to create convection forces within the aquifer that prevent mixing of the supply and return water. Thus, when the heat exchanger is on cooling so that the water is being heated, the water is withdrawn from the lower portion of the aquifer and returned to the upper portion of the aquifer where, by virtue of being warmer and less dense, it will float as a segregated layer on the other aquifer water without any tendency to mix with the water in the lower portion of the aquifer. On the other hand, when the heat exchanger is on heating so that the water is being cooled, the direction of water flow is reversed whereby water is withdrawn from the upper aquifer and returned to the lower aquifer, so that the cooler, more dense water will sink to the bottom of the aquifer, again as a segregated layer avoiding mixing with the water being withdrawn from the upper aquifer. To avoid mixing within the well bore a buffer region may be set up by displacing the input end of the supply pipe sufficiently from the exhaust end of the return pipe, or by providing a mechanical barrier such as in the form of one or more well packers.

An alternative or modified embodiment including a plenum device or supply chamber arrangement that may act as a mechanical barrier to mixing in the well, and which embodiment may be found preferable to that of FIG. 2 in that only one pump, one supply pipe and one return pipe are required, is shown in FIG. 7. It will be seen that the system of this embodiment uses only two pipes or conduits extending into the well bore, that is, a single supply pipe 30 and a single return pipe 50, both of which are connected to a plenum device or housing 80 disposed in the well bore 2 between the upper portion A' and lower portion A" of the aquifer. The return pipe 50 extends through the device into the lower region or portion A" of the aquifer and the lower end of supply pipe 30 is fitted with a suitable submersible pump 90 for withdrawing water from a chamber or plenum 130 within the housing 80. The housing 80 may be cylindrical in form and is preferably dimensioned to fit sufficiently snugly within the well bore 2 between the upper and lower portions of the aquifer to act as a barrier to the flow or mixing of the water between these portions in the well. The upper and lower walls 80a, 80b of the housing 80 are provided with intake valves 81 and 82, respectively, that may be electrically controlled from the earth's surface in combination with pump 90. Valves 81 and 82, respectively control the flow of water from the upper and lower portions of the aquifer into the chamber 130 and each valve may be fitted with a suitable inlet device, such as a guide tube or protective screen, 81a and 82a, respectively. The volume of the chamber 130 will be selected to accommodate an adequate supply of water that, in combination with the valve openings, will permit an initial withdrawal and a rate of flow through the chamber resulting in smooth withdrawal of water from the aquifer by the pump 90 when set at its highest capacity.

As seen in FIG. 7, the housing 80, which may be constructed of any suitable water-impervious, corrosion-resistant material, as will be familiar to those skilled in the art, has an annular side wall 80c to which at least one of the end walls 80a, 80b, is removably attached. The other end wall may be formed integrally with the side wall 80c or sealingly attached in the same manner as the removable wall such as by bolting or other appropriate fastening means. Upper wall 80a, which is shown in FIG. 7 to be the removable wall, is formed on either side of the intake valve opening with two additional openings 83, 84 for passing supply pipe 30 and return pipe 50, respectively. Opening 83 may be threaded to engage and accommodate the threaded lower end of supply pipe 30, to which lower end submersible pump 90, disposed in chamber 130, may be threadedly attached by a suitable connector 91. Opening 84, along with an opening 85 in bottom wall 80b, is provided with a suitable coupling or a connecting means 86 for sealingly fastening return pipe 50 to the device 80. In the assembled condition, the housing 80, the pipes 30 and 50, and the pump 90 and the valving with their electrical connections, can be inserted as an integral unit into the well bore 2.

Supply pipe 30 at its upper end is connected to or branches into input lines 30a and 30b connected to a heat exchange device, which in this embodiment is preferably a water-source heat pump 100. Line 30a, the "hot" line, is connected to the heat extractor side of the pump 100 and line 30b, the "cool" or "cold" line, is connected to the heat load side of the pump. A "hot" exhaust line 70a from the heat extractor side and a "cool" exhaust line 70b from the heat load side are connected to return line 70 which in turn connects with return pipes 50 and 60. Flow through lines 30a and 30b is controlled by shut-off valves 31 and 32, respectively, while lines 70a and 70b are controlled by valves 71 and 72, respectively, and flow through return pipe 50 is controlled by valve 51. With this system, the heat pump 100 may be operated in both a heating and cooling mode as desired in appropriate seasons by passing water therethrough in the manner as will now be described.

To operate the system in winter when it is desired to withdraw heat from the aquifer and transfer it to the air or other medium at the earth's surface, valve 31 to the "hot" input of the pump 100 is opened and valve 32 is closed, while valve 71 at the output of the pump is opened and valve 72 is closed. Valve 51 connected to return line 50 is set to pass water to the lower open end of the pipe. With the valving at the earth's surface so arranged the "hot" intake valve 81 in the top of the housing 80 is actuated to open while the "cool" intake valve 82 is held closed. Then, when submersible pump 90 is turned on to begin withdrawing water from the aquifer, water from the upper portion A' of the aquifer will be drawn in through intake valve 81 and pass through the chamber 130 up into pipe 30. This water withdrawn from the upper part of the aquifer is supplied through pipe 30 and open line 30a to the heat extractor side of heat pump 100.

Heat is extracted from the water when passing through the pump 100 and the cooled water is then conducted through open exhaust line 70a and open return line 50 down into the lower portion of the well and aquifer. The return water being at a lower temperature than the withdrawn water, which is normally at the mean temperature of the aquifer prior to the operation of the pump 90, will, by virtue of its greater density, tend to drop to the bottom of the aquifer and stratify horizontally with respect to the other water in the aquifer. Continued pumping by pump 90 will withdraw water from the upper portion A' of the aquifer that is still at the initial mean temperature while the exhaust or return water at the lower temperature will tend to remain and spread in a laminar manner horizontally in the lower portion A" of the aquifer creating a temperature difference within the aquifer as explained in connection with the previously described embodiments. It will be seen that in aquifers of limited depth or high back pressure no mechanical mixing of or heat transfer between the water in the upper and lower portions of the well bore will occur with this embodiment since the housing 80 will act as a barrier to positively prevent any such communication within the well bore 2. If necessary, additional packing 131 may be placed between the housing periphery and the well bore wall to complete the barrier and, of course, pipe 50 may be suitably insulated and sealed to prevent heat transfer with the upper portion of the aquifer and the chamber.

Conversely, when it is desired to operate the heat pump 100 for cooling, such as during the summer or for refrigeration purposes, the system is adjusted by closing valves 31 and 71 and opening valves 32 and 72 and valve 51 is set to direct the water flow in line 50 out through exit pipe 51a. With the valving at the earth's surface so arranged, the "cool" intake valve 82 in the bottom of the housing 80 is actuated to open while the "hot" intake valve 81 is held closed. Then when submersible pump 90 is turned on to begin withdrawing water from the aquifer, water from the lower portion A" of the aquifer will pass through intake valve 82 and the chamber 130 up into pipe 30. This water withdrawn from the lower part of the aquifer is supplied through pipe 30 and open line 30b to the heat load side of heat pump 100. After taking up heat while passing through the heat pump 100, the heated water is conducted through open exhaust lines 70b and 70 to return pipe 50 and out through exit pipe 51a into the upper portion A' of the aquifer. In this instance, then, the water which has been warmed and thus is of lower density will tend to float on the relatively cooler water in the aquifer. Again, the convection forces will act to maintain the desired stratified condition so that the relatively cooler water at the mean temperature will continue to be withdrawn from the lower portion of the aquifer and the warmer back or return water will float in the upper portion without any tendency for the warmer and cooler water to mix. The temperature difference will continue to exist for comparatively long periods of time so that the aquifer may be used for "hot" or "cold" storage as will be discussed below and as the aquifer water temperature will always eventually seek the geographical mean, the aquifer will always be usable as a heat source or sink.

The use of a mechanical buffer may be obviated by adapting the system of FIG. 1 so as to replace the reversible pump 20 with submersible pumping devices 22a and 22b at the lower ends of the pipes 3 and 4 respectively, as shown in FIG. 8. The pumping devices 22a, 22b are reversible pump-turbines which, in addition to reducing the pressure of the return water entering the aquifer, can particularly be utilized advantageously to minimize the energy consumption of the system.

In the latter regard, it will be appreciated that the largest percentage, for example about 90%, of the electrical power input from power source PS, supplied through conduit 15 and lines 16 to the particular pumping device withdrawing the water from the aquifer A, is used to raise the water from the static level in the well to the level of heat exchanger 1 at the earth's surface. The remaining percentage, about 10%, is converted to heat through frictional effects in the pump, a substantial amount of which heat is transferred to the water being raised. Consequently, the supply water to the heat exchanger 1 in addition to containing the natural aquifer heat also contains some heat energy converted from the input power and has a large portion of energy, corresponding to about 90% of the input power, stored therein as water head. Now by adapting the pumping device at the bottom of the pipe acting as the return pipe in either the heating or cooling mode, to operate as a turbine rather than a pump by virtue of the reverse flow therethrough, the stored energy in the downwardly-flowing water can be converted back to electrical energy. The turbine can produce an electrical power output over lines 16 in an amount comparable to the amount of the power input used to raise the water to the earth's surface, depleted merely by the amount of energy converted to heat through frictional effects in the turbine. Thus, the energy consumed by the system is only that due to the losses in the pump-turbine, electrical lines and power source, some of which losses are converted to heat that becomes useful in the system such as when operating in the heating mode. The electrical energy produced by the turbine at the end of the return pipe in either mode may be used to directly assist in driving the pump at the end of the supply pipe or to power some other component in the overall electrical system, but in either event, this energy will greatly offset the total amount of energy required to operate the heat-exchanging system so that the total power consumption is minimized. The overall efficiency of the heat-exchanging system will be further enhanced in the heating mode since much of the power consumed will go to heat the supply water, and while the system may be comparatively less efficient for this reason in the cooling mode, the entire system should ultimately consume far less energy in operation than those of the other embodiments or of any of the prior art systems.

Regarding the elimination of the mixing buffer, it will be seen that since the pressure of the water leaving the turbine and passing into the aquifer will be less than that at the input to the turbine, the latter of which would essentially be the pressure at the open end of the pipe without the turbine, the tendency for the exhausting water to rise within the aquifer and cause mixing in the well bore will be comparatively decreased and accordingly will normally obviate the need for a mechanical barrier.

A further embodiment in accordance with the present invention may be provided wherein no water is extracted from the aquifer, but rather a heat-exchanging medium or fluid is circulated within a separate system which extends into the well bore. This latter system is shown in FIG. 3. Supply and return pipes 40 and 41 are appropriately connected at their upper ends to a suitable heat-exchange device H, such as heat exchanger 1 or heat pump 10, and a suitable heat exchanging fluid is circulated within the closed system formed thereby. As shown in FIG. 3 the lower ends of the supply and return pipes 40 and 41 within the well are connected to a second suitable heat-exchanging device 42 which is disposed in a buffer region 43 between the upper portion and lower portion of the aquifer A. The heat-exchanging device 42 is disposed in a channel or passage 44 in a buffer device 45 which may comprise one or more well packers forming a barrier within the well bore 2. A pumping means, preferably in the form of a small reversible pump 46, is disposed in such a manner as to cause flow of the aquifer water through the passage 44 in heat-exchanging relationship with the heat-exchanging device 42. Accordingly, when heat is to be extracted from the water by the heat-exchanging device 42, the pump 46 is operated to produce a flow of water from the upper portion A' to the lower portion A" of the aquifer. Heat exchanger fluid at a lower temperature than the mean temperature of the aquifer is pumped down supply pipe 40 and withdraws heat from the water flowing past the device 42. The thus-heated fluid flows up return pipe 41 to the heat exchanger H. The downwardly-flowing water after being cooled by heat exchange with the fluid circulating within heat exchanger 42 is caused to sink into the lower portion A" of the aquifer creating the desired temperature difference. When heat is to be extracted by the water from the heat-exchanging device 42, the fluid in supply pipe 40 is at a higher temperature than that of the aquifer and the water flow within the aquifer is reversed so that the warmed water will be directed into and float in the upper portion A' of the aquifer, whereby no mixing of water at different temperatures again occurs within the aquifer by virtue of the convection forces therein.

It will be appreciated that a further advantage may be derived with the present invention when the system is used continuously throughout the year, or at least during successive winter and summer seasons. For example, the temperature difference created within a given aquifer during the summer will provide warmer water in the upper portion of the aquifer than that at the normal mean temperature in the lower portion of the aquifer. Thus when water from the upper portion of the aquifer is supplied to the earth's surface during the subsequent winter, the additional heat stored in the aquifer due to summer operation of the system will be made available when desired for enhanced heat transfer. Similarly, the cooler water supplied to the lower part of the aquifer during the winter will be available for supply to the earth's surface during the summer. Thus, the present system not only creates a desirable temperature difference within the aquifer, but also enhances the temperature difference between the ambient temperature at the earth's surface and the portion of the aquifer from which water is to be supplied during the following season.

A further embodiment of the present invention, wherein solar energy may be stored in the aquifer, can be achieved by modifying the basic system shown in FIG. 1 to use the heat exchanger 1 as a solar collector or connecting a solar collector SC and circulating system to heat exchanger 1 as seen in FIG. 5. In this embodiment, pipe 4 is used as the supply pipe and pipe 3 as the return pipe. Water at the mean temperature of the aquifer is withdrawn through pipe 4 and absorbs solar heat in the heat-exchange device 1 increasing its temperature to as high as 160° F. or more. This highly heated water is then returned through pipe 3 to the upper portion of the aquifer where it will conveniently float on the remainder of the water in the aquifer A. As the upper surface of the highly heated water will be in contact with the earth at the top of the aquifer, evaporation, such as may occur in solar ponds or other solar heat-storing applications, will be prevented, so that the solar heat will be substantially retained in the aquifer until the water is ready to be withdrawn through pipe 3 for use to produce heating at the earth's surface.

Similarly, the systems shown in FIGS. 2, 3, and 7 can be adapted to achieve such solar energy storage by the use of a solar collector in place of or in combination with heat pump 10, heat exchanger H, and heat pump 100, respectively.

Figure 9:
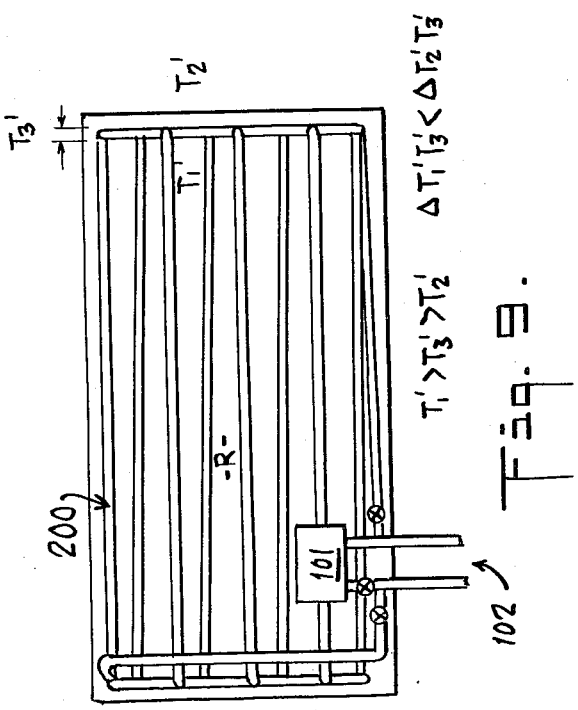
FIG. 9 is a diagrammatic view of a heat-exchanging system for an enclosure in accordance with the present invention.

Another heat exchanger arrangement for utilizing the aquifer water raised to the earth's surface by the present invention is shown in FIG. 9. In this embodiment, the heat exchanger is in the form of a piping system 200 for circulating the water about the periphery of a room, or a building such as a warehouse, to create and maintain a constant temperature within the enclosure. For example, if the enclosed space R is to be warmed during cold weather, its interior temperature may be raised by using a heat pump 101 and a system 102 in accordance with the present invention or by any conventional heating means. When the desired interior temperature $T_1'$ is achieved, the heating means may then be turned off and the supply water, or heat-exchanging fluid as the case may be, from the well at a temperature $T_3'$, may be circulated by system 102 through the peripheral piping system 200 about the walls of the enclosure. As the rate of heat transfer between two adjoining regions at different temperatures is proportional to the magnitude of the temperature difference between them, the circulating water at an intermediate temperature $T_3'$ between that of the enclosure $T_1'$ and of surrounding atmosphere $T_2'$ will tend to significantly decrease the heat loss rate. For example, in a typical situation, if the room R is at 68° F. will tend to give off heat at a more rapid rate to the outside due to the 20° temperature difference while the rate of heat transfer between the room interior and the water will be significantly slower by virtue of the 8° temperature difference. Therefore, the peripheral circulation of the aquifer water will act as a temperature buffer significantly reducing the rate of heat loss from the space R to the exterior. The inverse situation of course will occur during hot weather when the interior of the enclosure R is to be cooled. It will accordingly be seen that the system of the present invention will be applicable to and useful as a heat source and heat sink in many diverse heat exchange applications.

Suitable hardware and operating components for constructing the systems of the present invention are for the most part readily obtainable commercially, and their selection, combination and construction will be within the purview of those skilled in the appropriate art in view of the foregoing description.

What is claimed is:

1. A method of using ground water in an aquifer as a heat source and heat sink comprising the steps of:
    sinking a well bore into an aquifer through an upper portion and into a lower portion in said aquifer, and in which aquifer the ground water is normally at a substantially uniform temperature;
    producing a flow of the ground water between said upper and lower portions of said aquifer through a defined path beginning and ending in said well bore;
    exchanging heat with said flowing ground water at a defined region along said flow path; and
    producing a flow of ground water through said flow path such that water from which heat is to be extracted and water which has absorbed heat in the defined region is respectively withdrawn from and returned to said upper aquifer portion, and water which is to absorb heat and water from which heat has been extracted in said defined region is respectively withdrawn from and returned to said lower aquifer portion.

2. The method of claim 1 wherein the heat exchanging in said defined region is between the ground water and a heat pump at the earth's surface.

3. The method of claim 1 wherein said defined region is formed by a passage through a water flow barrier disposed in said well bore between said upper and lower portions of said aquifer, and the heat exchanging in said defined region is between the ground water and a heat-exchanging fluid passing through a heat exchanger disposed in said passage.

4. The method of claim 3 comprising the further step of exchanging heat between said passing heat-exchanging fluid and a solar collector at the earth's surface.

5. The method of claim 1 wherein the heat exchanging in said defined region is between the ground water and a solar collector at the earth's surface.

6. The method of claim 1 comprising the further step of preventing the mixing of the water of said upper portion and said lower portion of said aquifer in said well bore by disposing a water flow barrier in the well bore between the levels of said upper and lower portions of said aquifer.

7. The method of claim 6 wherein the beginning of said defined water flow path comprises a chamber in said water flow barrier.

8. A system capable of operation through a single well bore for using ground water in an aquifer as a heat source and a heat sink comprising:
   inlet means disposed in the upper portion of said aquifer for admitting the ground water thereinto from said upper portion;
   outlet means disposed in the upper portion of said aquifer for exhausting ground water therefrom into said upper portion;
   inlet means disposed in the lower portion of said aquifer for admitting the ground water thereinto from said lower portion; and
   outlet means disposed in the lower portion of said aquifer for exhausting ground water therefrom into said lower portion;
   heat exchanger means for exchanging heat with the ground water conducted through said water-conducting means; and
   means for producing ground water flow from and to said aquifer through said water-conducting means to selectively create a temperature difference in the normally uniform temperature ground water in said aquifer inhibiting convective mixing by causing warmer water to accumulate in the upper portion and cooler water to accumulate in the lower portion, said flow-producing means comprising:
   means for drawing ground water from which heat is to be extracted in said heat exchanger means, through said upper aquifer inlet means into said water-conducting means;
   means for returning ground water which has absorbed heat in said heat exchanger means through said upper aquifer outlet means into said upper aquifer portion;
   means for drawing ground water which is to absorb heat in said heat exchanger means, through said lower aquifer inlet means into said water-conducting means; and
   means for returning ground water from which heat has been absorbed in said heat exchanger means, through said lower aquifer outlet means into said lower aquifer portion.

9. A system for using ground water in an aquifer as a heat source and a heat sink comprising:
   a well bore extending into an aquifer through an upper portion and into a lower portion in said aquifer;
   barrier means disposed in said well bore between said upper and lower portions of said aquifer for blocking the mixing in said well bore of water at the respective levels of said upper and lower portions of said aquifer;
   means for defining a passage in said barrier means to permit the flow of water between said upper and lower portions of said aquifer within said well bore;
   heat-exchanger means disposed in said passage for exchanging heat with the aquifer water passing through said passage; and
   means for producing water flow through said passage such that water from which heat is to be extracted and water which has absorbed heat through contact with said heat-exchanger means is respectively caused to flow from and to said upper aquifer portion and water which is to absorb heat and water from which heat has been extracted by contact with said heat-exchanger means is respectively caused to flow from and to said lower aquifer portion.

10. A system as in claim 9 wherein said heat-exchanger means comprises means for passing a heat-exchanging fluid therethrough and further comprising heat-exchanging means at the earth's surface for exchanging heat with said heat-exchanging fluid.

11. A system as in claim 10 wherein said heat-exchanging means comprises piping means for circulating said heat-exchanging fluid about the periphery of an enclosure with which heat is to be exchanged.

12. A system as in claim 10 wherein said heat-exchanging means comprises a solar collector.

13. A system for using ground water in an aquifer as a heat source and a heat sink comprising:
   a well bore extending into an aquifer through an upper portion and into a lower portion in said aquifer;
   water-conducting means for conducting ground water from and returning it to said well bore comprising:
   conduit means extending into said well bore to the level of said lower aquifer portion for withdrawing ground water from and returning it to both said lower aquifer portion and said upper aquifer portion;
   heat-exchanger means for exchanging heat with the aquifer water passing through said water-conducting means; and
   means for producing water flow from said aquifer through said water-conducting means such that water from which heat is to be extracted and water which has absorbed heat is respectively withdrawn from and returned to said upper aquifer portion; and water which is to absorb heat and water from which heat has been extracted is respectively withdrawn from and returned to said lower aquifer portion; and wherein said conduit means comprises:
   supply line means for withdrawing water through said well bore from said aquifer and conducting said withdrawn water to said heat-exchanger means, and return line means for returning water, which has been conducted from said aquifer to said heat-exchanger means, from said heat-exchanger means to said aquifer within said well bore, and wherein said supply line means comprises:
means for defining a chamber disposed in said well bore between the levels of said upper and lower portions of said aquifer;
valve means for selectively admitting water from either said upper portion of said aquifer into said chamber or from said lower portion of said aquifer into said chamber; and
means for conducting said admitted water to said heat exchanger means.

14. A system as in claim 11 wherein said chamber-defining means comprises means for preventing the water being returned to said well bore from mixing with the water being withdrawn therefrom.

15. A system as in claim 11 wherein said valve means comprises a first valve mounted on the upper wall of said chamber for opening and closing communication between the water in said upper portion of said aquifer and said chamber and a second valve mounted on the lower wall of said chamber for opening and closing communication between the water in said lower portion of said aquifer and said chamber.

16. A system as in claim 11 wherein said water flow producing means comprises submersible pump means for pumping aquifer water through said supply line means.

17. A system for using ground water in an aquifer as a heat source and a heat sink comprising:
a well bore extending into an aquifer through an upper portion and into a lower portion in said aquifer;
water-conducting means for conducting ground water from and returning it to said well bore comprising:
conduit means extending into said well bore to the level of said lower aquifer portion for withdrawing ground water from and returning it to both said lower aquifer portion and said upper aquifer portion;
heat-exchanger means for exchanging heat with the aquifer water passing through said water-conducting means; and
means for producing water flow from said aquifer through said water-conducting means such that water from which heat is to be extracted and water which has absorbed heat is respectively withdrawn from and returned to said upper aquifer portion; and water which is to absorb heat and water from which heat has been extracted is respectively withdrawn and returned to said lower aquifer portion; and wherein said conduit means comprises:
supply line means for withdrawing water through said well bore from said aquifer and conducting said withdrawn water to said heat-exchanger means, and return line means for returning water, which has been conducted from said aquifer to said heat-exchanger means, from said heat-exchanger means to said aquifer within said well bore; and said supply line means comprises a pipe having a threaded lower end; and chamber defining means disposed in said well bore between the levels of said upper and lower portions of said aquifer with an upper wall having a threaded opening therein for accomodating a portion of the threaded lower end of said pipe;
and wherein said water flow producing means comprises submersible pump means for pumping aquifer water through said supply line means; and
further comprising means for attaching said submersible pump means to said threaded lower end of said pipe.

18. A system for using ground water in an aquifer as a heat source and a heat sink comprising:
a well bore extending into an aquifer through an upper portion and into a lower portion in said aquifer;
water-conducting means for conducting ground water from and returning it to said well bore comprising:
conduit means extending into said well bore to the level of said lower aquifer portion for withdrawing ground water from and returning it to both said lower aquifer portion and said upper aquifer portion;
heat-exchanger means for exchanging heat with the aquifer water passing through said water-conducting means; and
means for producing water flow from said aquifer through said water-conducting means such that water from which heat is to be extracted and water which has absorbed heat is respectively withdrawn from and returned to said upper aquifer portion; and water which is to absorb heat and water from which heat has been extracted is respectively withdrawn from and returned to said lower aquifer portion; and wherein said conduit means comprises a first pipe extending into said well bore to the level of said upper aquifer portion and a second pipe extending into said well bore to the level of said lower aquifer portion; and said water flow producing means comprises:
a first pump-turbine means connected to said first pipe for withdrawing water through said well bore from said upper aquifer portion and supplying it to said heat exchanger means and for withdrawing energy from water returned to said upper aquifer portion from said heat exchanger means; and
a second pump-turbine means connected to said second pipe for withdrawing water through said well bore from said lower aquifer portion and supplying it to said heat exchanger means and for withdrawing energy from water returned to said lower aquifer portion from said heat exchanger means.

19. A system as in claims 13, 17 or 18 wherein said heat-exchanger means comprises a heat pump.

20. A system as in claims 13, 17 or 18 wherein said heat-exchanger means comprises piping means for circulating said aquifer water about the periphery of an enclosure with which heat is to be exchanged.

21. A system as in claims 13, 17 or 18 wherein said heat exchanger means comprises a solar collector.

* * * * *

UNITED STATES PATENT OFFICE
CERTIFICATE OF CORRECTION

Patent No. 4,448,237               Dated 5/15/84

Inventor(s) William Riley

It is certified that error appears in the above-identified patent and that said Letters Patent are hereby corrected as shown below:

In the Specification:

Col. 1, line 39, "normali" should read --normally--.

5, line 33, "withdrawn" should read --withdraw--.
8, line 59, "pipe of 7" should read --of pipe 7--.

In the Claims:

Claim 8, the first sub-paragraph should read --
water-conducting means, extending into an aquifer in which the ground water is normally at a substantially uniform temperature, for conducting ground water from and returning it to said aquifer, said water conducting means comprising: --.

Signed and Sealed this

Fourth Day of December 1984

[SEAL]

Attest:

GERALD J. MOSSINGHOFF

Attesting Officer         Commissioner of Patents and Trademarks